(12) United States Patent
Kim et al.

(10) Patent No.: US 8,882,881 B2
(45) Date of Patent: Nov. 11, 2014

(54) METHOD FOR CONCENTRATING AND RECOVERING PRECIOUS METALS FROM SPENT MOBILE PHONE PCBS AND SPENT AUTO-CATALYSTS USING WASTE NONFERROUS SLAG

(75) Inventors: Byung-Su Kim, Jeonlabuk-do (KR); Dong Hyo Yang, Chungcheongnam-do (KR); Kang-In Rhee, Daejeon (KR); Jae Chun Lee, Daejeon (KR); Jin Ki Jeong, Daejeon (KR); Doyun Shin, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 80 days.

(21) Appl. No.: 13/525,656

(22) Filed: Jun. 18, 2012

(65) Prior Publication Data
US 2013/0276585 A1 Oct. 24, 2013

(30) Foreign Application Priority Data
Apr. 24, 2012 (KR) .................. 10-2012-0042533

(51) Int. Cl.
*C22B 11/00* (2006.01)
*C22B 7/04* (2006.01)
*C22B 11/02* (2006.01)

(52) U.S. Cl.
CPC .............. *C22B 7/04* (2013.01); *C22B 11/025* (2013.01)
USPC ............................................ 75/631; 75/10.65

(58) Field of Classification Search
CPC ................................ C22B 7/04; C22B 11/025
USPC ................................................ 75/631, 10.65
See application file for complete search history.

(56) References Cited

FOREIGN PATENT DOCUMENTS

| JP | 2004-083962 A | 3/2004 |
| JP | 2004-277791 A | 10/2004 |
| JP | 2011-032553 A | 2/2011 |

OTHER PUBLICATIONS

Machine translation of KR 10-2004-0040165 published May 12, 2004.*
Machine translation of KR 99070806 published Sep. 15, 1999.*
Bahn, et al. Derwent Acc No. 2000-563596 for the patent family including KR 99070806 A published Sep. 15, 1999.*
Kim et al. Derwent Acc. No. 2004-621712 for the patent family including KR 2004040165 A published May 12, 2004.*

* cited by examiner

*Primary Examiner* — George Wyszomierski
*Assistant Examiner* — Tima M McGuthry Banks
(74) *Attorney, Agent, or Firm* — Rabin & Berdo, P.C.

(57) ABSTRACT

The present invention relates to a method of concentrating and recovering precious metals from waste mobile phone PCBs and spent automotive catalysts using waste nonferrous slag, in which precious metals such as gold, silver, platinum, palladium or rhodium can be concentrated and recovered by simultaneously treating different industrial wastes, including waste nonferrous slag, waste mobile phone PCBs and spent automotive catalysts, and industrial waste can be recycled as resources. According to the present invention, it is possible to maximize the utilization ratio of precious metal resources that totally depend on the import in terms of the domestic situation of a poor-natural resources country. In addition, the industrial waste can widely be utilized for the recovery of precious metals in the fields of household appliance recycling and electronic part manufacture, and the recycling of industrial by-products discharged in the field of non-ferrous refinery.

5 Claims, 2 Drawing Sheets

METHOD FOR CONCENTRATING AND RECOVERING PRECIOUS METALS FROM SPENT MOBILE PHONE PCBS AND SPENT AUTO-CATALYSTS USING WASTE NONFERROUS SLAG

TECHNICAL FIELD

The present invention relates to a method of recovering precious metals, which are used as raw materials for high-tech products, from waste mobile phone printed circuit boards (PCBs) and spent automotive catalysts by a single process using waste nonferrous slag that is classified as industrial waste. More particularly, the present invention relates to a method of concentrating and recovering precious metals from waste mobile phone PCBs and spent automotive catalysts using waste nonferrous slag, the method comprising adding waste nonferrous slag, and caustic lime (CaO) as a flux for controlling slag composition, to waste mobile phone PCBs and spent automotive catalysts, followed by melting at high temperature, whereby precious metals such as gold, silver, platinum, palladium, and rhodium, contained in the waste mobile phone PCBs and the spent automotive catalysts, are captured and concentrated in metals such as iron, copper, tin, and nickel, contained in the waste nonferrous slag and the waste mobile phone PCBs, and recovering the captured and concentrated precious metals. In the present invention, waste nonferrous slag which is an industrial waste discharged from a process for smelting nonferrous metals such as copper, lead, and zinc can be used not only as fluxes for controlling slag composition, but also as metals for capturing precious metals, and a plastic component contained in waste mobile phone PCBs can be used as a reducing agent, whereby the amount of alloy phase produced can be increased to facilitate the separation of the alloy phase from the slag phase, thus shortening the process time while remarkably reducing the use of fluxes such as alumina ($Al_2O_3$), caustic lime (CaO), magnesia (MgO), iron oxide (FeO) and silica ($SiO_2$), and the reducing carbon, without using metals for capturing precious metals, such as copper, iron, lead and nickel, and the reducing agent carbon, which cause an increase in process cost. In addition, according to the present invention, not only precious metals such as gold, silver, platinum, palladium, and rhodium, but also valuable metals such as iron, copper, nickel, and tin, can be recovered from waste mobile phone PCBs and spent automotive catalysts, and slag generated in the present invention causes no environmental problem and can be recycled as resources.

BACKGROUND ART

In general, printed circuit boards (PCBs) mounted in information/telecommunication devices such as waste mobile phones contain precious metals such as gold, silver, and palladium, as well as valuable metals such as copper, tin, and nickel. Although the contents of the precious metals to be recovered vary depending on the model and production year of mobile phones, it is known that the printed circuit boards of mobile phones contain about 240-400 g/T of gold, about 2000-3000 g/T of silver, about 10-100 g/T of palladium, about 5-15 wt % of copper, 0.1-0.2 wt % of nickel, and 0.3-0.7 wt % of tin. In addition, precious metals which are used as catalysts for purifying automotive exhaust gases include platinum, palladium and rhodium, which are distributed as fine particles on the surface of honeycomb-type carriers at specific ratios. When automobiles are scrapped, spent automotive catalysts containing platinum, palladium, rhodium, and the like are generated, and the contents of these precious metals slightly vary depending on the manufacturer, model and production year of automobiles, but are about 55-790 g/T.

Meanwhile, as information/telecommunication devices are rapidly developed and the replacement cycle of automobiles is shortened, the generation of industrial waste such as waste mobile phone PCBs and spent automotive catalysts is sharply increased, and the environmental pollution caused thereby becomes a social issue.

However, precious metals contained in waste such as waste mobile phone PCBs and spent automotive catalysts are important as raw materials for high-tech products and are also high priced and high value-added, and hence are too precious to dispose of as waste. Thus, recovering and recycling such precious metals contributes to the national economy and is required in terms of effective utilization of resources.

A method for recovering precious metals from industrial waste such as mobile phone PCBs and spent automotive catalysts is broadly divided into a pyrometallurgical method and a hydrometallurgical method.

Among them, the hydrometallurgical method is a method of recovering precious metals from waste mobile phone PCBs and spent automotive catalysts by direct leaching using aqua regia or hydrochloric acid solution. In this method, there are disadvantages in that a large amount of wastewater is generated and the residue after recovery of precious metals is difficult to dispose of. For this reason, the hydrometallurgical method involves much difficulty in recovering precious metals from waste mobile phone PCBs and spent automotive catalysts which have low precious metal contents. Thus, the hydrometallurgical method has not yet been commercialized.

Meanwhile, the pyrometallurgical method includes a method that employs a nonferrous metal smelting furnace, and a method that employs an exclusive furnace.

The method that employs the nonferrous metal smelting furnace is a method of concentrating, separating and recovering precious metals as a nonferrous metal phase from waste mobile phone PCBs by charging the waste mobile phone PCBs together with nonferrous concentrate or copper matte into the nonferrous metal smelting furnace and melting the charged waste mobile phone PCBs at high temperature. This method has advantages in that no wastewater is generated and the generated slag can be effectively recycled because it has little or no adverse effect on the environment. However, there is a disadvantage in that a long working time is required. In addition, this method cannot be applied to industrial waste such as spent automotive catalysts which contain a large amount of alumina ($Al_2O_3$) that increases the viscosity of slag.

The method that employs the exclusive furnace can be divided into two categories: one in which various fluxes for controlling slag composition, such as alumina ($Al_2O_3$), caustic lime (CaO), magnesia (MgO), iron oxide (FeO) or silica ($SiO_2$), a reducing agent such as carbon, and metals for capturing precious metals, such as copper, iron, lead or nickel, are added to waste mobile phone PCBs and spent automotive catalysts, which are then melted at high temperature, thereby recovering precious metals; and the other in which various fluxes for controlling slag composition, such as alumina ($Al_2O_3$), caustic lime (CaO), magnesia (MgO), iron oxide (FeO) or silica ($SiO_2$), and a reducing agent such as carbon, are added to waste mobile phone PCBs and spent automotive catalysts, which are then melted at high temperature, thereby recovering precious metals.

The method that employs the exclusive furnace has advantages in that no wastewater is generated and the generated slag can be effectively recycled because it has little or no adverse effect on the environment. However, this method has a disadvantage in that it requires metals for capturing precious metals, such as copper, nickel, iron or nickel, various fluxes for controlling slag composition, such as alumina ($Al_2O_3$), caustic lime (CaO), magnesia (MgO), iron oxide (FeO) or silica ($SiO_2$), and the reducing agent carbon in large amounts, which increases production cost. In addition, the excusive furnace-based method that does not employ the metals for capturing precious metals, such as copper, iron, lead or nickel, has a disadvantage in that, because the amount of alloy phase obtained in the process is small, the alloy phase is difficult to separate from the slag phase, resulting in an increase in process time.

Accordingly, the present inventors have made extensive efforts to solve the above-described problems occurring in the prior art and, as a result, have found that, when small amounts of waste nonferrous slag and caustic lime are added to waste mobile phone PCBs and spent automotive catalysts, which are then melted at high temperature, precious metals such as gold, silver, platinum, palladium and rhodium contained, in the waste mobile phone PCBs and the spent automotive catalysts, can be captured and concentrated in metals such as iron, copper, tin and nickel, contained in the waste nonferrous slag and the waste mobile phone PCBs, and can be simultaneously recovered. Based on this finding, the present invention has been completed.

DISCLOSURE OF INVENTION

Technical Problem

The above-described method of concentrating and recovering precious metals by simultaneously treating waste mobile phone PCBs and spent automobile catalysts has a disadvantages in that, because metals for capturing precious metals, such as copper, nickel, iron or nickel, various fluxes for controlling slag composition, such as alumina ($Al_2O_3$), caustic lime (CaO), magnesia (MgO), iron oxide (FeO) or silica ($SiO_2$), and the reducing agent carbon are used in large amounts, high treatment cost is required. In addition, the process that does not use the metals for capturing precious metals, such as copper, iron, lead or nickel, has a disadvantage in that, because the amount of alloy phase produced is small, the alloy phase is difficult to separate from the slag phase, resulting in an increase in process time. Accordingly, the present invention has been made in order to solve such problems, and it is an object of the present invention to provide a method for recovering precious metals from waste mobile phone PCBs and spent automotive catalysts, in which the iron component contained in waste nonferrous slag which is discharged as industrial waste from a process for smelting nonferrous metals such as copper, lead or zinc is used as an agent for capturing precious metals, while the remaining components contained in waste nonferrous slag are used as agents for controlling slag composition, and the flux CaO is added to supplement the deficiency of the flux component (slag composition controlling agent) of waste nonferrous slag. Thus, waste nonferrous slag which is an industrial waste is used not only as a flux for controlling slag composition, but also as an agent for trapping precious metals.

In addition, in the present invention, the plastic component contained in waste mobile phone PCBs are used as a reducing agent, and metals for capturing precious metals, such as copper, iron, lead or nickel, and the reducing agent carbon, which increase the process cost, are not used. Furthermore, among various agents for controlling slag compositions, such as alumina ($Al_2O_3$), caustic lime (CaO), magnesia (MgO), iron oxide (FeO) or silica ($SiO_2$), only caustic lime (CaO) is used, and thus the process time can be shortened. Thus, an object of the present invention is to provide a method of concentrating and recovering precious metals from waste mobile phone PCBs and spent automotive catalysts using waste nonferrous slag, in which precious metals such as gold, platinum, palladium or rhodium can be concentrated and recovered by simultaneously treating different industrial wastes, including waste nonferrous slag, waste mobile phone PCBs and spent automotive catalysts, and industrial waste can be recycled as resources. In addition, another object of the present invention is to provide a method in which iron oxide, silica and caustic lime, which are contained in waste nonferrous slag, silica contained in the waste mobile phone PCBs, and cordierite contained in spent automobile catalysts, can be used as fluxes for controlling slag composition, and valuable metals such as iron, copper, tin or nickel can be recovered, and the resulting slag causes no environmental problems and can be recycled as resources.

Technical Solution

In order to achieve the above objects, the present invention provides a method of concentrating and recovering precious metals from waste mobile phone PCBs and spent automotive catalysts using waste nonferrous slag, the method comprising the steps of: (a) crushing waste nonferrous slag; (b) crushing spent automotive catalysts; (c) mixing caustic lime (CaO), which is a flux for controlling slag composition, uniformly with the waste nonferrous slag resulting from step (a), and melting the mixture; (d) introducing waste mobile phone PCBs and the spent automotive catalysts of step (b) into the melt of step (c), followed by melting; and (e) maintaining the melt of step (d) for a predetermined time to separate the melt into an alloy phase containing precious metals and a slag phase containing no precious metal.

Other features and embodiments of the present invention will be more apparent from the following detailed descriptions and the appended claims.

Advantageous Effects

According to the present invention, the iron contained in waste nonferrous slag and the metals (such as copper, iron, tin or nickel) contained in waste mobile phone PCBs are used as metals for capturing the precious metals (such as gold, silver, platinum, palladium or rhodium) contained in waste mobile phone PCBs and spent automotive catalysts, and the plastic component contained in waste mobile phone PCBs is used as a reducing agent, whereby the amount of an alloy phase can be increased without having to add metals for capturing precious metals from waste mobile phone PCBs and spent automotive catalysts, so that the process of separating the alloy phase from the slag phase can be facilitated, thus remarkably shortening the process time. In addition, iron oxide, silica and caustic lime, which are contained in waste nonferrous slag, and silica contained in waste mobile phone PCBs, and cordierite contained in spent automobile catalysts, are used as fluxes for controlling slag composition, thereby significantly reducing the number and amount of fluxes for controlling slag composition.

Furthermore, in the present invention, waste mobile phone PCBs and spent automotive catalysts are not separately treated to recover precious metals, but the waste mobile phone PCBs and the spent automotive catalysts are simultaneously treated, whereby the precious metals can be recovered at a recovery rate of 98% or more and the generated slag can be recycled. Thus, the present invention is energy-saving, environmentally-friendly technology and enables precious metals to be recovered simultaneously from different industrial wastes, making it possible for the recovered precious metals to be recycled as resources.

In addition, as information/telecommunication devices have been rapidly developed and the replacement cycle of automobiles has been shortened, the generation of industrial waste such as waste mobile phone PCBs and spent automotive catalysts is expected to be increased. The present invention can positively solve problems, such as the waste of resources and environmental pollution problems, which are caused by waste mobile phone PCBs and spent automotive catalysts.

Meanwhile, according to the present invention, precious metals can be concentrated and recovered from waste mobile phone PCBs and spent automotive catalysts using the waste nonferrous slag as industrial waste, which can significantly reduce the number and amount of fluxes for controlling slag composition, without using precious metal-capturing metals and the reducing agent carbon, as well as valuable metals such as iron, copper, nickel and tin can be recovered. Also, slag generated in the present invention causes no environmental problems and can be recycled as resources.

Therefore, the present invention is an energy-saving, environmentally-friendly technology which does not result in process residue that causes environmental pollution, while it enables different industrial wastes to be simultaneously treated in a single process so as to be utilized as resources.

BEST MODE FOR CARRYING OUT THE INVENTION

Figure 1:
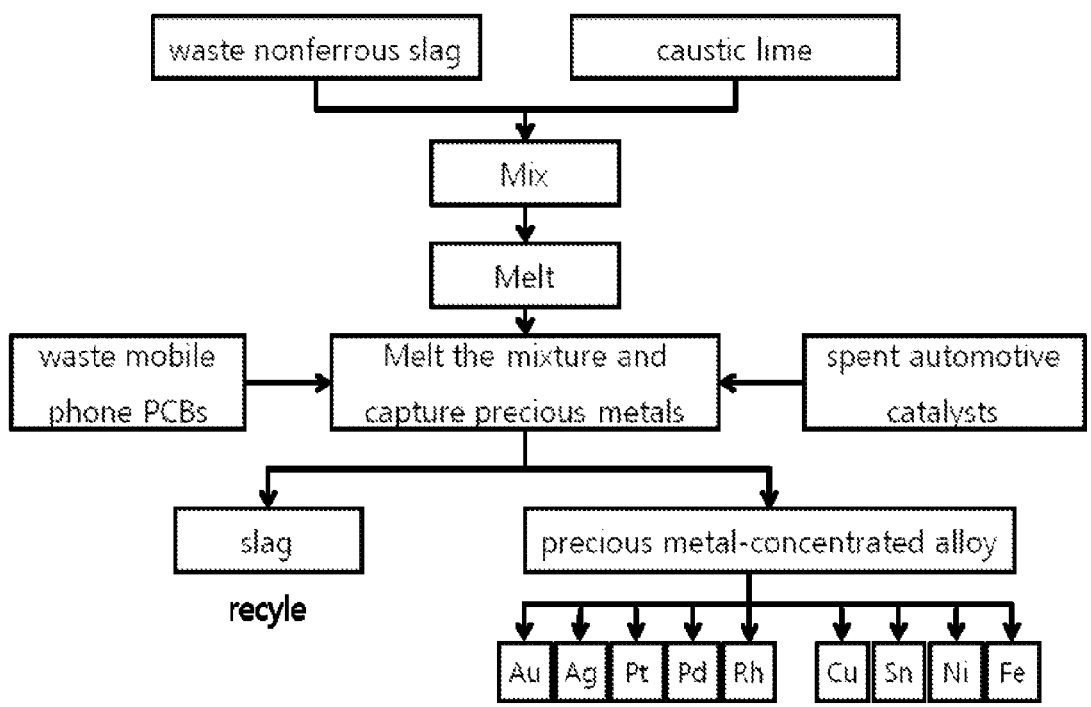
FIG. 1 is a schematic block diagram illustrating a process according to the present invention.
Figure 2:
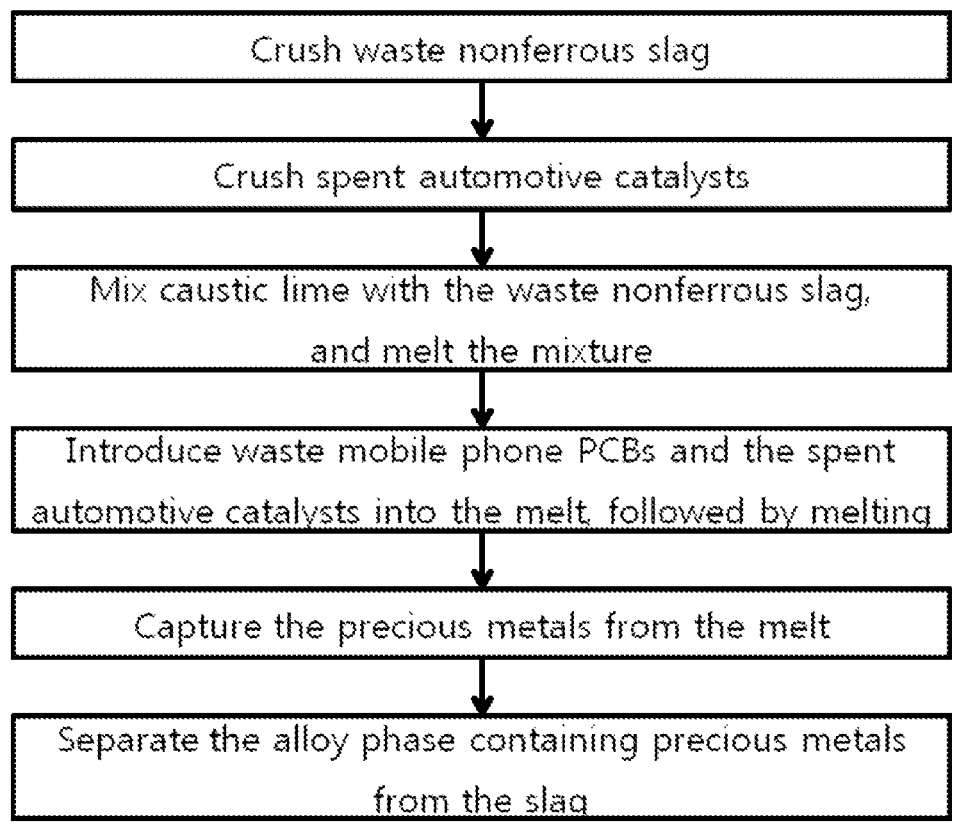
FIG. 2 is a flow block diagram illustrating a method of recovering precious metals from waste mobile phone printed circuit boards (PCBs) and spent automotive catalysts using waste nonferrous slag according to the present invention.

In one aspect, the present invention is directed to a method of concentrating and recovering precious metals such as gold, silver, platinum, palladium, and rhodium from waste mobile phone PCBs and spent automotive catalysts using waste nonferrous slag which is an industrial waste discharged from a process for smelting nonferrous metals such as copper, lead, and zinc. The method includes the steps of: (a) crushing waste nonferrous slag; (b) crushing spent automotive catalysts; (c) mixing caustic lime (CaO), which is a flux for controlling slag composition, uniformly with the waste nonferrous slag resulting from step (a), and melting the mixture; (d) introducing waste mobile phone PCBs and the spent automotive catalysts of step (b) into the melt of step (c), followed by melting; and (e) maintaining the melt of step (d) for a predetermined time to separate the melt into an alloy phase containing precious metals and a slag phase containing no precious metal.

In the present invention, in step (a), the waste nonferrous slag may be crushed in such a fashion that waste nonferrous slag discharged from a process for producing copper, lead, and zinc is crushed into small particles with a diameter of from 0.5 to 1.5 cm. If the particle diameter of the waste nonferrous slag is less than 0.5 cm, the melting time is slightly shortened, but the generation of dust is increased, and thus there will be no advantage according to a reduction in the particle diameter of the waste nonferrous slag. On the contrary, if the particle diameter of the waste nonferrous slag exceeds 1.5 cm, there is a disadvantage in that the melting time is extended.

The waste nonferrous slag used in the present invention is slag that is produced as a byproduct from a process for producing nonferrous metals such as copper, lead, zinc, etc. The waste nonferrous slag contains alumina ($Al_2O_3$), caustic lime (CaO), iron oxide (FeO), magnesia (MgO), and silica ($SiO_2$) as main components. In the present invention, among the main components, FeO is contained in the largest amount (i.e., in an amount of about 40-60% by weight) in the waste nonferrous slag. Iron oxide contained in the waste nonferrous slag is partially reduced such that it can be used as an agent for capturing precious metals, and some of iron component exists in the state of an iron oxide such that it can be used as agents for controlling slag composition. Based on this fact, the waste nonferrous slag was used as a main element of the present invention.

In the present invention, in step (b), the spent automotive catalysts may be crushed into small particles with a diameter of from 0.5 to 1.0 cm. If the particle diameter of the spent automotive catalysts is less than 0.5 cm, the melting time is slightly shortened, but the generation of dust is increased, and thus there will be no advantage according to a reduction in the particle diameter of the spent automotive catalysts. Contrarily, if the particle diameter of the spent automotive catalysts exceeds 1.0 cm, there is a disadvantage in that the melting time is extended.

In the present invention, in step (c) of mixing caustic lime (CaO), which is a flux for controlling slag composition, uniformly with the waste nonferrous slag resulting from step (a), and melting the mixture, the caustic lime (CaO) may be uniformly mixed in an amount of 5 to 40 parts by weight based on 100 parts by weight of the waste nonferrous slag, and the mixture is charged into an electric furnace, followed by melting at a temperature of from 1300 to 1450° C. for 10 to 20 minutes. In this case, the caustic lime (CaO) is charged as an agent for controlling slag composition in steps (d) and (e) into the electric furnace. If the amount of the caustic lime added is less than 5 parts by weight based on 100 parts by weight of the waste nonferrous slag or exceeds 40 parts by weight based on 100 parts by weight of the waste nonferrous slag, there is an disadvantage in that the melting temperature of the mixture of the waste nonferrous slag and the caustic lime is increased, leading to an increase in energy loss. In addition, if the amount of the caustic lime added is less than 5 parts by weight based on 100 parts by weight of the waste nonferrous slag or exceeds 40 parts by weight based on 100 parts by weight of the waste nonferrous slag, the viscosity of the slag in step (d) is disadvantageously increased, leading to a decrease in the recovery rate of the precious metals in step (e).

In the present invention, iron oxide, silica and caustic lime, which are contained in the waste nonferrous slag, silica contained in the waste mobile phone PCBs, and cordierite contained in the spent automobile catalysts, can be used as fluxes for controlling slag composition.

Further, if the melting temperature of the mixture is less than 1300° C., there is a disadvantage in that the mixture of the waste nonferrous slag and the caustic lime is not completely melted. On the contrary, if the melting temperature of the mixture exceeds 1450° C., the mixture of the waste nonferrous slag and the caustic lime is completely melted to form a liquid melt, but the melting time is extended, leading to an increase in energy loss.

In addition, if the melting time of the mixture is less than 10 minutes, there is a disadvantage in that the mixture of the waste nonferrous slag and the caustic lime is not completely melted. On the contrary, if the melting time of the mixture exceeds 20 minutes, the mixture of the waste nonferrous slag and the caustic lime is completely melted to form a liquid melt, but the melting time is extended, leading to an increase in energy loss.

In the present invention, in the step (d) of introducing waste mobile phone PCBs and the spent automotive catalysts of step (b) into the melt of step (c), followed by melting, the waste mobile phone PCBs and the spent automotive catalysts may be charged into an electric furnace in amounts of 40 to 70 parts by weight and 10 to 30 parts by weight, respectively, based on 100 parts by weight of the waste nonferrous slag, and followed by melting at a temperature of from 1300 to 1450° C. for 20 to 40 minutes. If the amount of the waste mobile phone PCBs added is less than 40 parts by weight or exceeds 70 parts by weight based on 100 parts by weight of the waste nonferrous slag, the viscosity of the slag is disadvantageously increased, leading to a decrease in the recovery rate of the precious metals in step (e). In addition, if the amount of the spent automotive catalysts added is less than 10 parts by weight or exceeds 30 parts by weight based on 100 parts by weight of the waste nonferrous slag, the viscosity of the slag is disadvantageously increased, leading to a decrease in the recovery rate of the precious metals in step (e).

Preferably, the waste mobile phone PCBs is introduced into the melt of step (c) as it is without being ground, may be introduced in the melt with cut divided into two or four parts depending on the model of the mobile phone.

If the melting temperature of the mixture is less than 1300° C., there is a disadvantage in that the viscosity of the slag is increased, leading to a decrease in the recovery rate of the precious metals in step (e). On the contrary, if the melting temperature of the mixture exceeds 1450° C., the viscosity of the slag is decreased, leading to a slight increase in the recovery rate of the precious metals in step (e), but there will be no advantage according to an increase in the melting temperature of the mixture.

If the melting time of the mixture is less than 20 minutes, there is a disadvantage in that the reduction rate of iron oxide contained in the waste nonferrous slag is low, which makes it difficult to separate an alloy phase from a slag phase in step (e), leading to an increase in the process time and a decrease in the recovery rate of the precious metals. Contrarily, if the melting time of the mixture exceeds 40 minutes, the reduction rate of iron oxide contained in the waste nonferrous slag is slightly increased, and thus there will be no advantage according to an increase in the melting time.

In the present invention, in the step (e) of maintaining the melt of step (d) for a predetermined time to separate the melt into an alloy phase containing precious metals and a slag phase containing no precious metal, the melt of step (d) may be maintained in an electric furnace for 10-20 minutes without additional supply of energy to separate the melt into the alloy phase containing precious metals and the slag phase containing no precious metal. If the maintaining time of the melt is less than 10 minutes, the process time is shortened, but the recovery rate of the precious metals is disadvantageously decreased. Contrarily, if the maintaining time of the melt exceeds 20 minutes, the recovery rate of the precious metals as the alloy phase is increased, but the viscosity of the slag phase is disadvantageously increased, making it difficult to separate the alloy phase from the slag phase.

In this case, after the melt is separated into the alloy phase and the slag phase, gold, platinum, palladium, rhodium, etc., are recovered and refined from the alloy phase in which the precious metals are concentrated. The slag phase containing no precious metals are re-used for recovery of other precious metals, or are used as raw materials of cement.

Resultantly, the present invention is aimed at presenting an energy-saving, environmentally-friendly technology that provides a method in which precious metals can be concentrated and recovered from the waste mobile phone PCBs and the spent automotive catalysts using waste nonferrous slag as industrial waste, valuable metals such as iron, copper, nickel, and tin can be recovered, and slag generated can be recycled as resources without causing no environmental problem, thereby remarkably reducing the number and use amount of fluxes even without additionally using metals for capturing precious metals, and the reducing agent carbon, and that enables industrial wastes disposed of to be utilized as resources.

EXAMPLES

Hereinafter, the present invention will be described in further detail with reference to examples. It will be obvious to those skilled in the art that these examples are illustrative purposes only and are not to be construed to limit the scope of the present invention.

Example 1

Waste nonferrous slag and spent automotive catalysts were crushed into small particles with a diameter of from 0.5 to 1.0 cm, respectively. The waste nonferrous slag thus crushed was then mixed with caustic lime (CaO), which is a flux as an agent for controlling slag composition. The caustic lime (CaO) was uniformly mixed in an amount of 40 parts by weight based on 100 parts by weight of the waste nonferrous slag by using a V-type mixer (Hanyang Science, Korea), and the mixture was charged into an electric furnace, followed by melting at 1300° C. for 20 minutes to obtain a melt. Waste mobile phone PCBs and the crushed spent automotive catalysts were charged into the melt thus obtained, and then were melted at 1450° C. for 20 minutes to obtain a melt. At this time, the amount of the waste mobile phone PCBs charged was 67 parts by weight based on 100 parts by weight of the waste nonferrous slag, and the amount of the spent automotive catalysts charged was 20 parts by weight based on 100 parts by weight of the waste nonferrous slag. Thereafter, the melt thus obtained was maintained in the electric furnace for 20 minutes without additional supply of energy to separate the melt into the alloy phase containing precious metals and the slag phase containing no precious metal.

As a result, the amount of the precious metals contained in 100 g of the waste mobile phone PCBs and 30 g of the spent automotive catalysts was as follows: gold-924.9 mg, silver-1897.5 mg, palladium-387.2 mg, platinum-316.2 mg, and rhodium-65.2 mg. The amount of the precious metals existing in the alloy phase in which the precious metals recovered by the present invention were trapped was as follows: gold-906.5 mg, silver-1877.8 mg, palladium-382.0 mg, platinum-310.8, and rhodium-64.8 mg, which shows that gold, silver, palladium, platinum, and rhodium were all more than 98% in recovery rate.

Example 2

Waste nonferrous slag and spent automotive catalysts were crushed into small particles with a diameter of from 0.5 to 1.0 cm, respectively. The waste nonferrous slag thus crushed was then mixed with caustic lime (CaO), which is a flux as an agent for controlling slag composition. The caustic lime (CaO) was uniformly mixed in an amount of 5 parts by weight based on 100 parts by weight of the waste nonferrous slag by using a V-type mixer (Hanyang Science, Korea), and the mixture was charged into an electric furnace, followed by melting at 1300° C. for 10 minutes to obtain a melt. Waste mobile phone PCBs and the crushed spent automotive catalysts were charged into the melt thus obtained, and then were melted at 1300° C. for 40 minutes to obtain a melt. At this time, the amount of the waste mobile phone PCBs charged was 50 parts by weight based on 100 parts by weight of the waste nonferrous slag, and the amount of the spent automotive catalysts charged was 15 parts by weight based on 100 parts by weight of the waste nonferrous slag. Thereafter, the melt thus obtained was maintained in the electric furnace for 15 minutes without additional supply of energy to separate the melt into the alloy phase containing precious metals and the slag phase containing no precious metal.

As a result, the amount of the precious metals contained in 100 g of the waste mobile phone PCBs and 30 g of the spent automotive catalysts was as follows: gold-927.7 mg, silver-1954.6 mg, palladium-359.9 mg, platinum-282.7 mg, and rhodium-32.7 mg. The amount of the precious metals existing in the alloy phase in which the precious metals recovered by the present invention were trapped was as follows: gold-909.5 mg, silver-1935 mg, palladium-354.8 mg, platinum-277.4, and rhodium-32.3 mg, which shows that gold, silver, palladium, platinum, and rhodium were all more than 98% in recovery rate.

Example 3

Waste nonferrous slag and spent automotive catalysts were crushed into small particles with a diameter of from 1.0 to 1.5 cm and from 0.5 to 1.0 cm, respectively. The waste nonferrous slag thus crushed was then mixed with caustic lime (CaO), which is a flux as an agent for controlling slag composition. The caustic lime (CaO) was uniformly mixed in an amount of 25 parts by weight based on 100 parts by weight of the waste nonferrous slag by using a V-type mixer (Hanyang Science, Korea), and the mixture was charged into an electric furnace, followed by melting at 1350° C. for 15 minutes to obtain a melt. Waste mobile phone PCBs and the crushed spent automotive catalysts were charged into the melt thus obtained, and then were melted at 1400° C. for 30 minutes to obtain a melt. At this time, the amount of the waste mobile phone PCBs charged was 50 parts by weight based on 100 parts by weight of the waste nonferrous slag, and the amount of the spent automotive catalysts charged was 25 parts by weight based on 100 parts by weight of the waste nonferrous slag. Thereafter, the melt thus obtained was maintained in the electric furnace for 10 minutes without additional supply of energy to separate the melt into the alloy phase containing precious metals and the slag phase containing no precious metal.

As a result, the amount of the precious metals contained in 100 g of the waste mobile phone PCBs and 50 g of the spent automotive catalysts was as follows: gold-1028.4 mg, silver-1777.9 mg, palladium-402.4 mg, platinum-331.1 mg, and rhodium-52.5 mg. The amount of the precious metals existing in the alloy phase in which the precious metals recovered by the present invention were trapped was as follows: gold-1008.3 mg, silver-1756.4 mg, palladium-396.8 mg, platinum-325.3, and rhodium-52.0 mg, which shows that gold, silver, palladium, platinum, and rhodium were all more than 98% in recovery rate.

The amount of respective samples added and the recovery rate in the above Examples 1, 2 and 3 were shown in Tables 1, 2 and 3 below.

TABLE 1

| Samples added | | | | | | | | Recovery rate (%) | | | | |
|---|---|---|---|---|---|---|---|---|---|---|---|---|
| Waste nonferrous slag | | Caustic lime (CaO) | | Waste mobile phone PCBs | | Spent automotive catalysts | | | | | | |
| Ratio (%) | Amount (g) | Ratio (%) | Amount (g) | Ratio (%) | Amount (g) | Ratio (%) | Amount (g) | Au | Ag | Pd | Pt | Rh |
| 44.1 | 150 | 17.6 | 60 | 29.4 | 100 | 8.8 | 30 | 98.0 | 99.0 | 98.7 | 98.3 | 99.4 |

TABLE 2

| Samples added | | | | | | | | Recovery rate (%) | | | | |
|---|---|---|---|---|---|---|---|---|---|---|---|---|
| Waste nonferrous slag | | Caustic lime (CaO) | | Waste mobile phone PCBs | | Spent automotive catalysts | | | | | | |
| Ratio (%) | Amount (g) | Ratio (%) | Amount (g) | Ratio (%) | Amount (g) | Ratio (%) | Amount (g) | Au | Ag | Pd | Pt | Rh |
| 58.8 | 200 | 2.9 | 10 | 29.4 | 100 | 8.8 | 30 | 98.0 | 99.0 | 98.6 | 98.1 | 98.8 |

TABLE 3

| Samples added | | | | | | | | | | | | |
|---|---|---|---|---|---|---|---|---|---|---|---|---|
| Waste nonferrous slag | | Caustic lime (CaO) | | Waste mobile phone PCBs | | Spent automotive catalysts | | Recovery rate (%) | | | | |
| Ratio (%) | Amount (g) | Ratio (%) | Amount (g) | Ratio (%) | Amount (g) | Ratio (%) | Amount (g) | Au | Ag | Pd | Pt | Rh |
| 50 | 200 | 12.5 | 50 | 25 | 100 | 12.5 | 50 | 98.0 | 98.8 | 98.6 | 98.2 | 99.0 |

INDUSTRIAL APPLICABILITY

As described above, according to the present invention, the waste nonferrous slag, the waste mobile phone printed circuit boards (PCBs), and the spent automotive catalysts are together melted at high temperature to separate iron oxide contained in the waste nonferrous slag by a reduction reaction and simultaneously to separate copper, iron, tin, and nickel contained in the waste mobile phone PCBs by the melting, so that gold, silver, platinum, and palladium, rhodium, contained in the waste mobile phone PCBs and the spent automotive catalysts, can be concentrated and recovered in the alloy phase by using the copper, iron, tin, and nickel alloy produced as metals for capturing the precious metals. In addition, waste nonferrous slag which is an industrial waste discharged from a process for smelting nonferrous metals such as copper, lead, and zinc can be used not only as fluxes for controlling slag composition, but also as metals for capturing precious metals, and a plastic component contained in the waste mobile phone PCBs can be used as a reducing agent, whereby the amount of alloy phase produced can be increased to facilitate the separation of the alloy phase from the slag phase, thus shortening the process time while minimizing the use of fluxes such as alumina ($Al_2O_3$), caustic lime (CaO), magnesia (MgO), iron oxide (FeO) and silica ($SiO_2$), and the reducing carbon, without using metals for capturing precious metals, such as copper, iron, lead and nickel, which cause an increase in the process cost. Thus, the precious metals such as gold, silver, platinum, palladium or rhodium can be concentrated and recovered by a single process by simultaneously treating different industrial wastes, including waste nonferrous slag, waste mobile phone PCBs and spent automotive catalysts, and industrial waste can be recycled as resources so as to be utilized as raw materials for high-tech products, thereby maximizing the utilization ratio of precious metal resources that totally depend on the import in terms of the domestic situation of Korea as a poor-natural resources country. Therefore, the industrial waste can widely be utilized for the recovery of precious metals in the fields of household appliance recycling and electronic part manufacture, and the recycling of industrial by-products discharged in the field of non-ferrous refinery.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method of concentrating and recovering precious metals from waste mobile phone PCBs (Printed Circuit Boards) and spent automotive catalysts using waste nonferrous slag, the method comprising the steps of:
    (a) crushing waste nonferrous slag;
    (b) crushing spent automotive catalysts;
    (c) uniformly mixing caustic lime (CaO), which is a flux for controlling slag composition, with the waste nonferrous slag resulting from step (a) thereby forming a mixture, wherein the caustic lime is present in an amount of 5 to 40 parts by weight based on 100 parts by weight of the waste nonferrous slag, the mixture being charged into an electric furnace, followed by melting at a temperature of from 1300 to 1450° C. for 10 to 20 minutes;
    (d) introducing waste mobile phone PCBs and the spent automotive catalysts of step (b) into the melt of step (c), followed by melting; and
    (e) maintaining the melt of step (d) for a predetermined time to separate the melt into an alloy phase containing precious metals and a slag phase containing no precious metal.

2. The method of claim 1, wherein the waste nonferrous slag is crushed into small particles with a diameter of from 0.5 to 1.5 cm.

3. The method of claim 1, wherein the spent automotive catalysts are crushed into small particles with a diameter of from 0.5 to 1.0 cm.

4. The method of claim 1, wherein in the step (d), the waste mobile phone PCBs and the spent automotive catalysts are charged into an electric furnace in amounts of 40 to 70 parts by weight and 10 to 30 parts by weight, respectively, based on 100 parts by weight of the waste nonferrous slag, and followed by melting at a temperature of from 1300 to 1450° C. for 20 to 40 minutes.

5. The method of claim 1, wherein in the step (e), the melt of step (d) is maintained in an electric furnace for 10-20 minutes without additional supply of energy to separate the melt into the alloy phase containing precious metals and the slag phase containing no precious metal.

* * * * *